April 7, 1953　　　　　C. C. THOMPSON　　　　2,633,643
　　　　　　　　　WHEEL-ALIGNMENT DEVICE
Filed April 24, 1947　　　　　　　　　　　2 SHEETS—SHEET 1
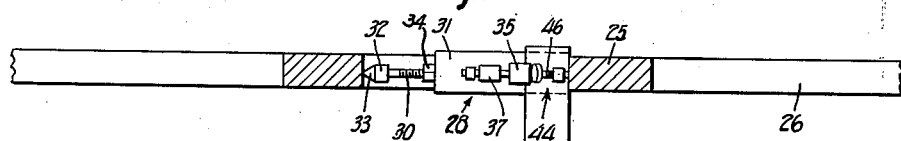
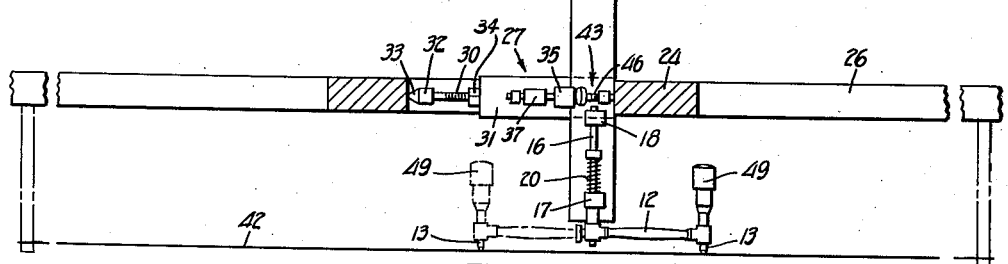
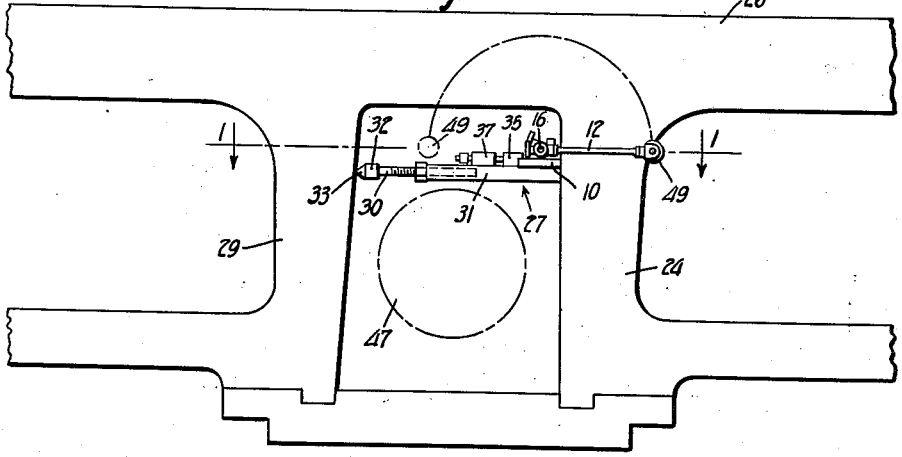
INVENTOR.
Charles C. Thompson
BY *Mitchell Herbert*
　　　ATTORNEYS April 7, 1953
C. C. THOMPSON
2,633,643
WHEEL-ALIGNMENT DEVICE
Filed April 24, 1947
2 SHEETS—SHEET 2
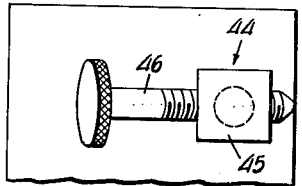
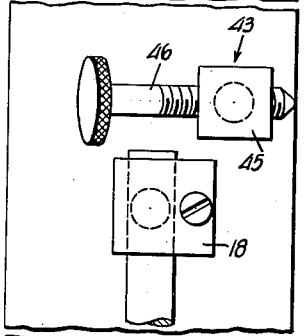
Fig. 3.
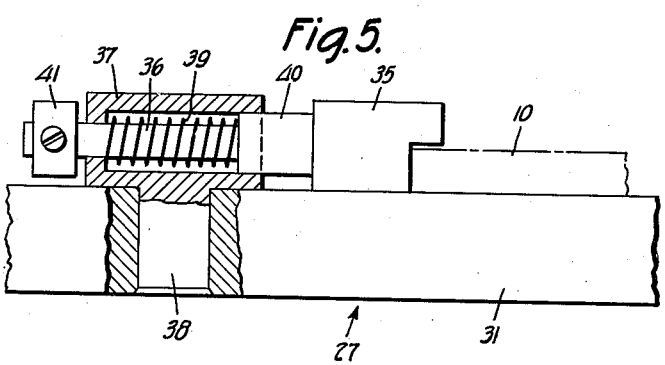
Fig. 5.
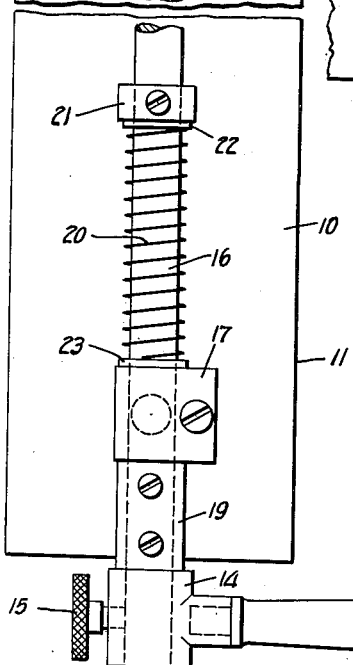
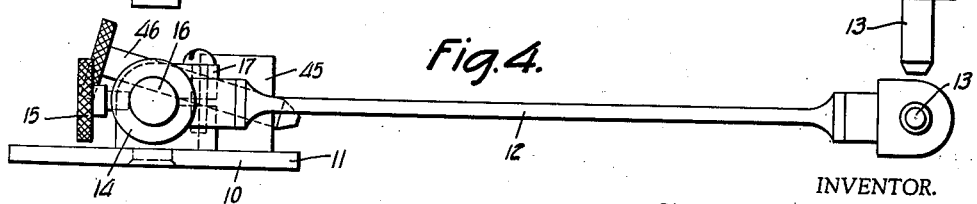
Fig. 4.
INVENTOR.
Charles C. Thompson
BY Mitchell Bechert
ATTORNEYS Patented Apr. 7, 1953

2,633,643

UNITED STATES PATENT OFFICE 2,633,643

WHEEL-ALIGNMENT DEVICE

Charles C. Thompson, McComb, Miss., assignor to Spence Engineering Company, Inc., Walden, N. Y., a corporation of New York Application April 24, 1947, Serial No. 743,705

7 Claims. (Cl. 33—181)

My invention relates to squaring devices and in particular to a tool for locating with accuracy a desired reference point on one or both sides of a vehicle, for proper location of a wheel axis.

In wheeled vehicles it is particularly important from the standpoint of wheel or tire and other wear that wheel axes be located with great care so as to run parallel with the roadway and perpendicular to the direction of travel. In railroad locomotives for example, if due to inadvertence or other causes, the axles for the main driving wheels are not truly perpendicular to the rails, there may be undue wear of wheel tires, and maintenance becomes costly not only from the viewpoint of replacing worn tires but also when the total lay-up time of the locomotive is considered.

It is an object of my invention to provide an improved device for more accurately locating a proper axle orientation for a wheeled vehicle.

It is a more specific object to provide a device of the character indicated particularly adapted to the improved locating of locomotive axles.

Other objects and various further features of the invention will be pointed out or will occur to those skilled in the art from a reading of the following specification in conjunction with the accompanying drawings. In said drawings:

Fig. 1 is a plan view of a device incorporating features of the invention, shown in application to journal pedestals in a locomotive frame;

Fig. 2 is a side view of the arrangement of Fig. 1;

Fig. 3 is an enlarged partially broken-away plan view of the device of Fig. 1;

Fig. 4 is a side view of the arrangement of Fig. 3; and

Fig. 5 is an enlarged fragmentary side view in partial section illustrating a feature of the arrangement of Figs. 1 and 2.

Briefly stated, my invention contemplates a squaring device having a longitudinal frame and pivotally supporting an arm for rotation about a longitudinal axis. The frame may have a straight edge, with the arm rotatable about an axis parallel thereto. In use on a locomotive, the straight edge may be clamped against corresponding faces of pedestal jaws on opposite sides of the frame, with the swinging arm projecting beyond one side of the frame. By swinging the arm first to one side and then to the other of its pivotal axis, a point on the end of the arm may be observed against a reference line, such as for example a taut wire or string passing through the center of an engine cylinder or running parallel to an engine frame and extending the length of the frame. If this simple test indicates the straight edge not to be at a right angle with the reference wire or string, adjustable means (such as jacks) may adjustably space the straight edge from one of the pedestal faces, until such time as the straight edge is truly perpendicular to the reference string. Reference marks may then be inscribed on both sides of the frame and serve to locate axle centers. The adjusted clearance between the straight edge and the pedestal-jaw faces may serve the function of also indicating correct shim or pedestal-shoe thicknesses to be employed.

Referring to the drawings, my invention is shown in application to a squaring device comprising a longitudinally extending frame member 10 having a straight edge 11 formed thereon. At one end of the frame member 10, an arm 12 is pivotally supported about an axis parallel to the straight edge 11. The arm 12 preferably carries a longitudinal projection 13 at its free end, for a purpose which will later be clear.

The pivotal suspension for the arm 12 preferably incorporates thrust-preloading means whereby the arm 12 may be maintained for certainty in one radial plane. In the form shown, the arm 12 includes at one end a boss 14, secured as by a set screw 15 to a shaft 16 on which it may swing. The shaft 16 is preferably journalled to the frame member 10 at longitudinally spaced points, as in bearing blocks 17—18. If desired, a spacer or stop collar 19 may be secured to the shaft 16 between the end bearing 17 and the boss 14 of arm 12. In the form shown, thrust-preloading of the suspension for arm 12 is accomplished by means of a compression spring 20 cooperating with a collar 21 carried between bearings 17—18 and on shaft 16. Washers 22—23 may be interposed between the spring and the collar 21 and bearing 17, respectively. It will be clear that with the structure described, the arm 12 may always be positioned in a single radial plane about the axis of shaft 16, and that this plane may be positively determined by the abutment of collar 19 against bearing 17, as urged by the compression spring 20.

In the application of the described squaring device to a locomotive frame, the straight edge 11 is preferably first abutted against corresponding faces of pedestal jaws 24—25 (or pedestal shoes) on opposite sides of the locomotive frame 26. In the form shown, the frame member 10 is held in this position by means of suitable clamps 27—28. In both pedestals the clamps 27—28 may hold themselves in position by a forcible engagement with the jaws in each pedestal. For example, in the case of the pedestal shown in Fig. 2, the opposed jaws 24—29 are engaged by the clamp 27. The clamp 27 may include jack means such as a screw 30 threadedly received in a body 31. The screw 30 may be formed with an enlarged head 32 having a knurled outer surface for ready adjustment and a pointed end 33 more firmly to engage the pedestal jaw 29. Once adjusted, the clamp 27 may be secured as by a lock nut 34.

In accordance with a feature of the invention, the clamp body 31 may carry latch means for properly engaging and retaining the frame member 10 of the squaring device. Referring to Fig. 5, the latch means may include a dog or catch 35 to engage the edge of the frame member 10 opposite from the straight edge 11. The dog or catch 35 may be formed with or carried by a slidable shank 36, slidable within a preferably enclosed guide 37. Guide 37 may be secured to the body 31 as by the depending portion 38 thereof. Resilient means such as a spring 39 may be carried within the guide member 37 so as compressibly to abut both the guide 37 and the enlarged part 40 of the shank 36. A desired longitudinal limiting positioning of the latch 35, when not engaged by the frame member 10, may be adjustably located by a collar 41 carried on a rearwardly projecting end of the shank 36.

It will be clear that with the structure described, once the clamps 27—28 have been secured in a selected desired position in their respective pedestals, it is a relatively simple matter positively to locate the frame 10 of the squaring device with its straight edge 11 against the desired pedestal faces. The latches such as the latch 35 may be resiliently pushed back to accommodate insertion of the frame 10 and then released to hold the same.

In use, I find it desirable first to mount and locate the frame 10 of my squaring device in the manner just indicated, and then to swing the arm 12 from the position shown in Fig. 1 in solid lines to the position shown in Fig. 1 in dot-dash lines, in order to note any difference in longitudinal clearance between the projection 13 and a calibrating line 42, for either of these positions. The calibrating line 42 may be the string or wire that is conventionally suspended alongside a locomotive frame for squaring or other reference purposes.

If there is a discrepancy between the clearances observed in either of the indicated positions, then in accordance with the invention I provide adjustable jacking means on the frame member 10 so to adjust the orientation of the straight edge 11 that it may finally become perpendicular to the reference line 42. In the form shown, the jacking means is provided in duplicate—a jack 43 for one side of the engine and a jack 44 for the other side. Each of the jacks 43—44 may include a boss 45 formed with or carried by the frame member 10 and a screw 46 threadedly engaging the boss 45. The screw 46 may adjustably project transversely beyond the straight edge 11.

If, as is frequently the case, a first seating of the straight edge 11 in direct abutment with the pedestal-jaw faces does not indicate the straight edge 11 to be truly perpendicular to the reference line 42, one or the other of the jacking devices 43—44 may require adjustment. For example, if the solid-line position of arm 12 in Fig. 1 indicates the greater clearance of projection 13 with reference line 42, it will be necessary to adjust the jack 43 to make it project transversely beyond the straight edge 11 and into abutment with the face of pedestal jaw 24. Such projection beyond the straight edge 11 will be understood forcibly to carry the entire arm end of the frame member 10 into more firm resilient engagement with the latch 35 (of clamp 27) and to displace the same generally about the other anchored end (as a fulcrum). Such adjustment, with successive swinging of the arm 12 against reference line 42, will finally produce the correct orientation of the straight edge 11. Suitable scriber marks may then be made on both sides of the frame 26 to serve as local references for the ultimate location of the main axle 47. It will be clear that if the clearance between projection 13 and the reference line 42 had been other than that which has been indicated, an appropriate adjustment of the jack 44 would have been in order.

In some cases it may develop that an initial insertion of the frame member 10 into the clamping devices 27—28 may not have entirely adequately positioned the projection 13 with respect to the reference line 42. In such case I prefer that the projection 13 be adjustably carried in the free end of arm 12. In the form shown, this free end is formed with a boss 48 to receive a threaded adjusting means 49, which may generally resemble a micrometer-screw adjusting means.

It will be clear that I have described a relatively simple device for assisting in the extremely accurate location of shaft axes. In practice I have found that locomotives on which my device has been utilized have shown materially reduced tire wear, and it has been observed that the ride of the engine itself is even smoother than was usually obtained previously.

While I have described my invention in detail for the preferred forms shown, it will be understood that modifications may be made within the scope of the invention as defined in the appended claims.

I claim:

1. In a squaring device of the character indicated, a longitudinally extending frame member having a straight longitudinally extending edge for locating abutment with two longitudinally spaced points, clamping means for securing the straight edge of said frame member with respect to said points, and an arm freely pivotally supported at one end of said frame member, the axis of said pivot being parallel to said straight edge, and cooperating axial-abutment means on said frame member and on said arm for limiting said arm against one relative axial movement with respect to said frame member.

2. In a squaring device of the character indicated, a longitudinally extending frame member having a straight edge for locating abutment with corresponding sides of opposite pedestal shears of a railway vehicle, clamping means for securing the straight edge of said frame member against said corresponding sides, an arm freely pivotally suspended at one end of said frame member on an axis parallel to said straight edge, and cooperating axial-abutment means on said frame member and on said arm for limiting said arm against one relative axial movement with respect to said frame member.

3. A device according to claim 2, in which said clamping means includes adjustable spacer means for adjustably spacing a part of said straight edge away from said side of one of said shears.

4. In a squaring device of the character indicated, a longitudinally extending frame member having a longitudinally extending straight edge, first clamping means and second clamping means at spaced longitudinal points along said frame member for clamping said straight edge firmly against reference points, each of said clamping means acting generally normal to said straight edge, an arm freely pivotally extending from one end of said frame member about an axis parallel to said straight edge, and cooperating axial-abutment means on said frame member and on said arm for limiting said arm against one relative axial movement with respect to said frame member.

5. A device according to claim 4, in which one of said clamping means includes adjustable spacer means for adjustably spacing said straight edge from said one of said reference points.

6. A squaring device according to claim 4, in which said pivotal suspension includes thrust-preloading means loading said abutment means, whereby said arm may be constantly urged to a fixed axial position so that only rotary movement may be permitted said arm.

7. In a wheel-axis alignment device of the character indicated, a longitudinally extending bar to pass between corresponding pedestal shears on opposite sides of a vehicle and including a longitudinally projecting end, an arm freely pivotally suspended at said end on an axis parallel to the axis of said bar, axial abutment means on said bar for limiting said arm against one relative axial movement with respect to said bar, clamping means engaging one side of each of said shears and including means resiliently urging said bar toward the other side of each of said shears, and jacking means engageable with said other side for adjustably positioning said bar.

CHARLES C. THOMPSON.

REFERENCES CITED

The following references are of record in the file of this patent:

UNITED STATES PATENTS

| Number | Name | Date |
|---|---|---|
| 409,295 | Loring | Aug. 20, 1889 |
| 437,225 | McDuff et al. | Sept. 30, 1890 |
| 617,123 | Roberts | Jan. 3, 1899 |
| 689,825 | Miller | Dec. 24, 1901 |
| 711,763 | Fox et al. | Oct. 21, 1902 |
| 900,666 | Cookman | Oct. 6, 1908 |
| 1,051,689 | Coleman | Jan. 28, 1913 |
| 1,204,039 | Lindeburg | Nov. 7, 1916 |
| 1,230,418 | Logan | June 19, 1917 |
| 1,311,602 | Harter | July 29, 1919 |
| 1,316,642 | Perkins et al. | Sept. 23, 1919 |
| 1,380,485 | Langeberg | June 7, 1921 |
| 1,678,761 | Bernhardt et al. | July 31, 1928 |
| 1,941,404 | Lansing | Dec. 26, 1933 |
| 2,170,824 | Lichtenwalner | Aug. 29, 1939 |
| 2,439,483 | Merriman | Apr. 13, 1948 |

FOREIGN PATENTS

| Number | Country | Date |
|---|---|---|
| 458,814 | Germany | Apr. 24, 1928 |
| 538,744 | Germany | Nov. 19, 1931 |